United States Patent
Frazier et al.

[11] Patent Number: 5,566,538
[45] Date of Patent: Oct. 22, 1996

[54] APPARATUS AND METHOD FOR REMOVING PLASTIC BAGS AND OTHER DEBRIS FROM TREES

[76] Inventors: Ian A. Frazier, 240 Woodworth Ave., Missoula, Mont. 59801; Thomas W. McClelland, 29 Rowe Rd., Alford, Mass. 01230

[21] Appl. No.: 350,259

[22] Filed: Dec. 6, 1994

[51] Int. Cl.⁶ ............................................. A01D 1/00
[52] U.S. Cl. ........................... 56/239; 56/339; 30/340
[58] Field of Search ...................... 56/339, 332, 239, 56/333, 335; 30/340, 251

[56] References Cited

U.S. PATENT DOCUMENTS

| 93,338 | 8/1869 | Parham | 56/339 |
| 1,124,991 | 1/1915 | Bartlett | 30/251 |
| 2,246,730 | 6/1941 | Hafdell | 30/251 |

FOREIGN PATENT DOCUMENTS

| 873169 | 2/1953 | Germany | 56/332 |

*Primary Examiner*—Terry Lee Melius
*Attorney, Agent, or Firm*—Felfe & Lynch

[57] ABSTRACT

Apparatus and method for removing plastic bags and other debris from trees utilizing an elongated pole, at least a cutting member having a cutting edge with the cutting member attached to the pole, and at least a hook member attached to the pole and extending transversely thereof.

6 Claims, 2 Drawing Sheets

APPARATUS AND METHOD FOR REMOVING PLASTIC BAGS AND OTHER DEBRIS FROM TREES

BACKGROUND OF THE INVENTION

This invention relates to an apparatus and a method for removing plastic bags and other debris from trees.

Heretofore, there are known a tree limb shaker of U.S. Pat. No. 2,542,665 for shaking a limb to remove a crop such as walnuts, almonds or fruit, and a limb and basket holder of U.S. Pat. No. 76,248, having a hook for hooking over a distant limb and a hook for hanging a fruit basket.

Tree saws or limb loppers could be useful for removing plastic bags and also for removing a less common type of debris, for example, ropes or cords that have been entangled in a tree. Such tools and methods do not have the universal quality of the apparatus we have invented which can be used to remove, for example, ropes, kites, clothes and shoes as well as metal and rubber or plastic objects.

SUMMARY OF THE INVENTION

It is an object of the present invention to provide a new and improved apparatus for removing plastic bags and other debris from trees which avoids one or more of the disadvantages and limitations of prior apparatus.

It is another object of the invention to provide a new and improved apparatus for removing plastic bags and other debris from trees, which is of simple construction.

It is another object of the invention to provide a new and improved method for removing plastic bags and other debris from trees, which avoids one or more of the disadvantages and limitations of prior methods.

It is another object of the invention to provide a new and improved method for removing plastic bags and other debris from trees which is simple to execute.

In accordance with the invention, apparatus for removing plastic bags and other debris from trees comprises an elongated pole, at least a cutting member having a cutting edge, the cutting member being attached to the pole. The apparatus also includes at least a hook member attached to the pole and extending transversely thereof.

Also in accordance with the invention, a method of removing plastic bags and other debris from trees comprises extending an elongated pole having a cutting member attached thereto to the vicinity of a plastic bag entangled in a tree. The method includes utilizing the cutting member to cut the entanglement of the plastic bag and utilizing the hook member attached to the pole to hook and remove the plastic bag from the tree.

For a better understanding of the present invention, together with other and further objects thereof, reference is made to the following description, taken in connection with the accompanying drawings, and its scope will be pointed out in the appended claims.

DETAILED DESCRIPTION OF THE PREFERRED EMBODIMENT

Figure 1:
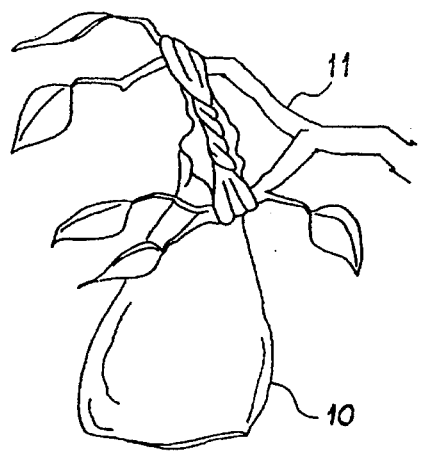
FIG. 1 is a perspective view of a plastic bag entangled in the limb of a tree.

FIG. 1 represents a plastic bag 10 entangled in a tree limb 11 as may be seen in various metropolitan areas.

Figure 2:
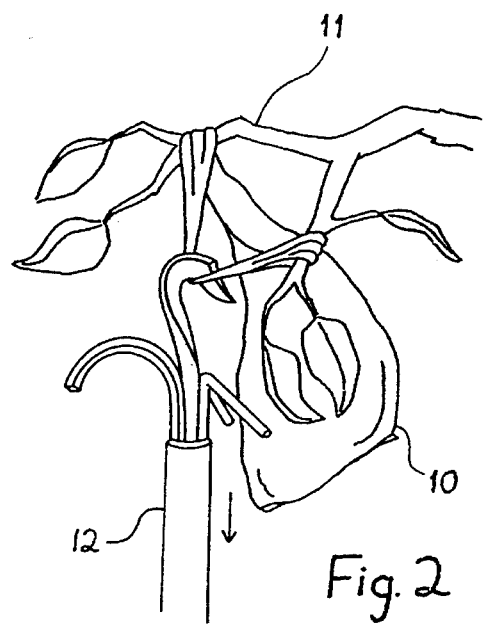
FIG. 2 is a perspective view of the FIG. 1 entanglement with apparatus in accordance with the invention hooked over a portion thereof.

FIG. 2 represents the plastic bag 10 entangled in the tree limb 11 while being cut by apparatus for removing plastic bags and other debris from trees.

Figure 5:
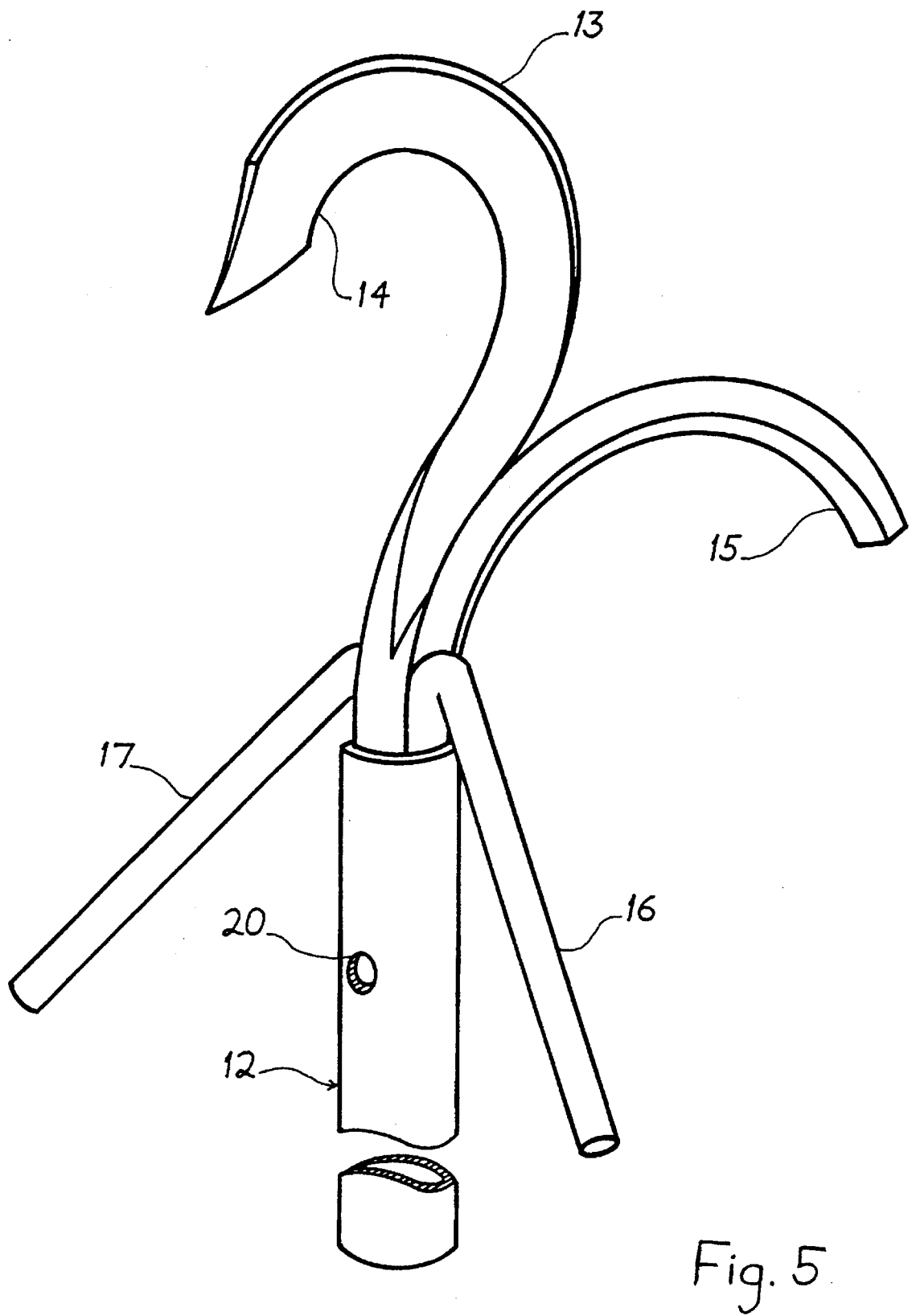
FIG. 5 is a fragmentary perspective view of the apparatus of FIG. 2 to an enlarged scale.

Referring for the moment more particularly to FIG. 5, the apparatus includes an elongated pole 12 shown in fragmentary view which may be of several feet or more in length and may be held by an operator. The apparatus includes a hook-like cutting member 13 having an inner cutting edge 14. The pole 12 preferably is a hollow pole and the cutting member 13 has a base portion extending into the end of the pole.

The apparatus also includes a hook member 15 attached to the pole and extending transversely thereof. The apparatus preferably also includes additional unsharpened hook members 16 and 17. The hook members 15, 16 and 17 have base portions preferably extending into and affixed to the pole, by for example, a bolt (not shown) extending through a hole 20 and fastened by a nut (not shown). The cutting member 13 extends distally beyond the hook members, with respect to the end of the pole.

Figure 3:
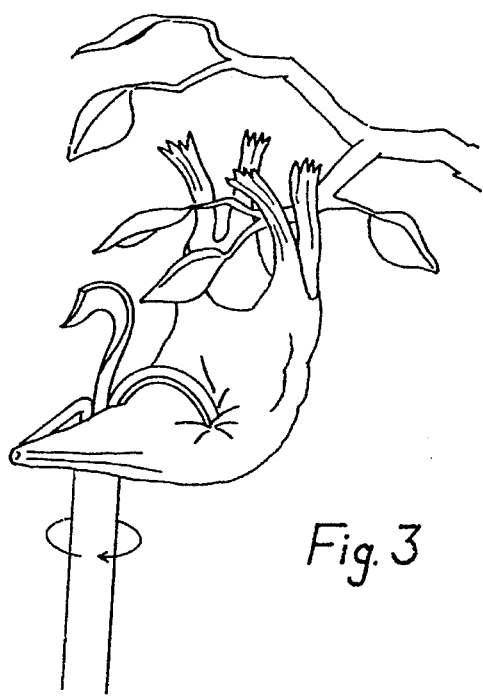
FIG. 3 is a perspective view of the plastic bag after being cut by the FIG. 2 apparatus and while being hooked by the FIG. 2 apparatus.
Figure 4:
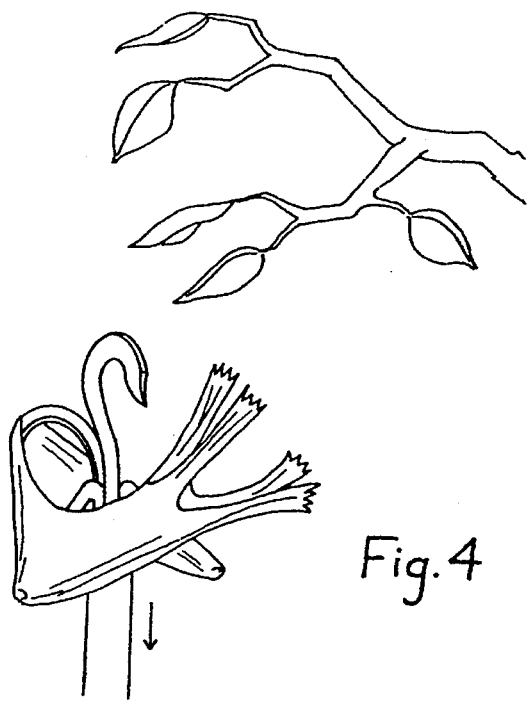
FIG. 4 is a perspective view of the plastic bag hooked by the FIG. 2 apparatus and being removed from the vicinity of the tree.

A method of removing plastic bags and other debris from trees comprises extending an elongated pole having a cutting member attached thereto to the vicinity of a plastic bag entangled in a tree. The method also includes Utilizing the cutting member 13 to cut the entanglement of the plastic bag, for example, in the manner represented in FIG. 2. The method also includes utilizing a hook member as represented, for example, in FIGS. 3 and 4 attached to the pole to hook and remove the plastic bag from the tree. As represented in FIGS. 3 and 4, the method preferably includes rotating the pole to utilize a polarity of hook members 15, 16 and 17 to hook and remove the plastic bag from the tree.

While there has been described what is at present believed to be the preferred embodiment of this invention, it will be obvious to those skilled in the art that various changes and modifications may be made therein without departing from the invention, and its scope will be pointed out in the appended claims.

What is claimed is:

1. A method of removing plastic bags and other debris from trees, comprising:

providing an elongated pole with an end, said end having fixed thereto a hook-like cutting member with a sharpened inside edge and a plurality of unsharpened hook members, said cutting member and said hook members being stationary with respect to each other;

extending said end to the vicinity of a plastic bag entangled in a tree;

utilizing the cutting member to cut the entanglement of the plastic bag; and utilizing at least one of said hook members to hook and remove the plastic bag from the tree.

2. A method in accordance with claim 1 which includes rotating the pole to utilize a plurality of said hook members to hook and remove the plastic bag from the tree.

3. Apparatus for removing debris from trees comprising an elongated pole having an end;

a hook-like cutting member fixed to said end, said cutting member having an inner cutting edge; and a plurality of hook members fixed to said end, said hook members being stationary with respect to each other and said cutting member, said cutting member extending distally beyond said hook members, with respect to the end of said pole.

4. Apparatus as in claim 3 wherein said hook members are arranged with polarity with respect to each other.

5. Apparatus for removing debris from trees comprising an elongated pole having an end;

a hook-like cutting member fixed to said end, said cutting member having an inner cutting edge; and a plurality of hook members fixed to said end, said hook members being stationary with respect to each other and said cutting member, said hook members being arranged with polarity with respect to each other.

6. Apparatus as in claim 5 wherein said cutting member extends distally beyond said hook members, with respect to the end of said pole.

\* \* \* \* \*